(12) United States Patent
Murakami

(10) Patent No.: US 8,505,412 B2
(45) Date of Patent: Aug. 13, 2013

(54) GEAR HOUSING FOR MOTOR AND MOTOR

(75) Inventor: Seiichi Murakami, Hamamatsu (JP)

(73) Assignee: Asmo Co., Ltd. (JP)

( * ) Notice: Subject to any disclaimer, the term of this patent is extended or adjusted under 35 U.S.C. 154(b) by 0 days.

(21) Appl. No.: 13/394,325

(22) PCT Filed: Nov. 11, 2011

(86) PCT No.: PCT/JP2011/076051
§ 371 (c)(1),
(2), (4) Date: Mar. 5, 2012

(87) PCT Pub. No.: WO2012/070408
PCT Pub. Date: May 31, 2012

(65) Prior Publication Data
US 2012/0272763 A1    Nov. 1, 2012

(30) Foreign Application Priority Data

Nov. 25, 2010   (JP) .................................. 2010-262082
Nov. 30, 2010   (JP) .................................. 2010-266932

(51) Int. Cl.
*F16H 57/02*   (2012.01)

(52) U.S. Cl.
USPC .......................................... 74/606 R; 74/425

(58) Field of Classification Search
USPC ............................................... 74/425, 606 R
See application file for complete search history.

(56) References Cited

U.S. PATENT DOCUMENTS

| | | | | |
|---|---|---|---|---|
| 2,672,766 A | * | 3/1954 | Dunkelberger | 74/640 |
| 3,766,801 A | * | 10/1973 | Wiegand | 74/480 B |
| 4,282,767 A | * | 8/1981 | Guichard | 74/427 |
| 6,051,899 A | | 4/2000 | Walther et al. | |
| 6,628,026 B2 | * | 9/2003 | Torii et al. | 310/89 |
| 6,938,511 B2 | * | 9/2005 | Meier et al. | 74/425 |
| 2004/0211283 A1 | * | 10/2004 | Ogasawara et al. | 74/473.12 |
| 2005/0039571 A1 | * | 2/2005 | Takabayashi et al. | 74/606 R |

FOREIGN PATENT DOCUMENTS

| | | |
|---|---|---|
| JP | 11-508850 A | 8/1999 |
| JP | 2001-016823 A | 1/2001 |
| JP | 2001-286095 A | 10/2001 |
| JP | 2005-137092 A | 5/2005 |
| JP | 2008-206374 A | 9/2008 |
| JP | 2009-225505 A | 10/2009 |
| WO | WO-9701464 A1 | 1/1997 |

OTHER PUBLICATIONS

"International Application Serial No. PCT/JP2011/076051, Written Opinion mailed Dec. 6, 2011", 3 pgs.

* cited by examiner

*Primary Examiner* — David M Fenstermacher
*Assistant Examiner* — Terence Boes
(74) *Attorney, Agent, or Firm* — Schwegman Lundberg & Woessner, P.A.

(57) ABSTRACT

A gear housing for a motor is fixed to a motor main body driving a rotary shaft. The gear housing contains a worm wheel and a worm connected to the rotary shaft. Three mounting feet to be fixed to a mounting member are formed at intervals and protrude from a first side surface of the gear housing. A bulge portion bulges outward on the first side surface of the gear housing to expand the internal space. The bulge portion has side walls, which are installed to protrude from the outer side surface constituting the side walls of the bulge portion, and an upper wall, which connects the distal ends in the protruding direction of the side walls. The three mounting feet are connected by the side walls and the upper wall.

17 Claims, 5 Drawing Sheets

GEAR HOUSING FOR MOTOR AND MOTOR

This application is a U.S. National Stage Filing under 35 U.S.C. 371 from International Patent Application Serial No. PCT/JP2011/076051, filed Nov. 11, 2011, which claims the priority benefit of Japan Application Serial No. 2010-266932, filed Nov. 30, 2010 and Japan Application Serial No. 2010-262082, filed Nov. 25, 2010, the contents of which applications are incorporated herein by reference in their entirety.

FIELD OF THE INVENTION

The present invention relates to a gear housing for a motor and a motor.

BACKGROUND OF THE INVENTION

A conventional motor used as a drive source for a vehicle wiper device and the like includes a motor main body, which drives a rotary shaft, and a speed reducing portion, which slows and outputs rotation of the rotary shaft. The speed reducing portion includes a gear housing fixed to the motor main body, a reduction gear (a worm and a worm wheel) contained in the gear housing, and an output shaft protruding outward from the gear housing and rotating integrally with the reduction gear (the worm wheel). In the case of the motor described in Patent Document 1, for example, a support cylindrical portion cylindrically protruding to support the output shaft is formed on the outer side surface of the gear housing. Three mounting feet to be fixed to a mounting member (a vehicle body) are formed to protrude at intervals around the support cylinder portion. The mounting feet are connected annularly to each other by an arcuate reinforcing rib on the outer side surface of the gear housing and are also connected to a reinforcing rib extending radially from the support cylinder portion. As a result, the rigidity of the gear housing is improved.

PRIOR ART DOCUMENT

Patent Document

Patent Document 1: Japanese Laid-Open Patent Publication No. 2005-137092

SUMMARY OF THE INVENTION

However, with the above-described gear housing, the mounting feet are connected by the reinforcing rib, but the reinforcing rib is installed to protrude in a plate state from the outer side surface of the gear housing and has a structure where the distal end can easily fail. Therefore, it becomes necessary to increase the thickness of the rib in order to ensure rigidity of the rib, and the amount of the material and the weight of the gear housing are increased.

An objective of the present invention is to provide a motor and a gear housing for the motor that reduces the amount of the material and the weight while improving the rigidity of the mounting feet.

To achieve the foregoing objective and in accordance with one aspect of the present invention, a gear housing for a motor is provided, in which the gear housing is fixed to a motor main body, which drives a rotary shaft, contains a reduction gear connected to the rotary shaft, and has a first side surface. The gear housing includes a plurality of mounting feet formed at intervals to protrude from the first side surface and to be fixed to a mounting member, and a bulge portion formed on the first side surface and bulging outward to expand an internal space of the gear housing. The bulge portion has a plurality of side walls installed to protrude from the first side surface and an upper wall, which connects distal ends in the protruding direction of the side walls. The mounting feet are connected together by the side walls and the upper wall.

According to the configuration, the bulge portion bulging outward to expand the internal space of the gear housing is formed on the first side surface. A plurality of the mounting feet are connected by the side walls installed to protrude from the first side surface and the upper wall, which connects the distal ends in the protruding direction of the side walls. Thus, the amount of the material and the weight of the gear housing are reduced while rigidity of the mounting feet is mutually improved. That is, since the rigidity of the side walls is improved by the distal ends thereof in the protruding direction connected by the upper wall, it is difficult for the side walls to fail. Therefore, the shape of the gear housing is simpler than a prior-art configuration in which a plurality of reinforcing ribs are provided. Moreover, the thickness of the bulge portion is reduced, and the amount of the material and the weight of the gear housing are reduced.

It is preferable that the mounting feet include three mounting feet, and the side walls continuously connect the three mounting feet so that a space is formed among the three mounting feet.

According to the configuration, the side walls continuously connect the three mounting feet to be fixed to the mounting member and thus, the rigidity of the side walls and the rigidity of the mounting feet are both improved.

It is preferable that the side walls connect the three mounting feet so that a triangle having the three mounting feet as apexes is formed when seen from the distal ends of the mounting feet.

According to the configuration, the side walls connect the mounting feet so that a triangle having the three mounting feet as apexes is formed when seen from the distal ends of the mounting feet. Thus, the three mounting feet are connected to each other rectilinearly by the shortest distances. Therefore, the amount of the material and the weight of the gear housing are reduced while the rigidity of the mounting feet is improved as compared with the annular connection of the mounting feet by the side walls, for example.

The gear housing for a motor preferably includes a cylindrical support cylinder portion, which supports an output shaft rotated integrally with the reduction gear, and the support cylinder portion is preferably connected to the bulge portion.

According to the configuration, the cylindrical support cylinder portion, which supports the output shaft integrally rotated with the reduction gear, is connected to the bulge portion, and thus, the rigidity of the support cylinder portion is also improved by the bulge portion.

The support cylinder portion preferably has an outer cylinder, which protrudes outward from the upper wall, and an inner cylinder, which protrudes inward from the upper wall and communicates with the outer cylinder.

According to the configuration, the support cylinder portion has the outer cylinder protruding outward from the bulge end wall of the bulge portion and the inner cylinder protruding inward from the bulge end wall and communicating with the outer cylinder. Thus, the rigidity is improved as compared with the support cylinder portion in which the output shaft having the same length as that of the output shaft supported by the outer cylinder and the inner cylinder is supported by protruding largely only to the outside from the bulge end wall, and the output shaft can be firmly supported. That is, the support cylinder portion needs to ensure rigidity to be able to receive a force in a direction orthogonal to the shaft applied to the output shaft (reaction force from the load), and a large force is applied particularly to the base end and the distal end of the support cylinder portion. Since the force in the orthogonal direction largely acts on the support cylinder portion, which supports the shaft by largely protruding only to the outside from the bulge end wall, the rigidity of the support cylinder portion needs to be designed to be high. In contrast, protrusion amounts of the outer cylinder and the inner cylinder from the upper wall can be small in the configuration in which the support cylinder portion has the outer cylinder and the inner cylinder. Therefore, the force in the orthogonal direction is relatively small, and the rigidity of the support cylinder portion can be designed to be low.

The mounting feet and the support cylinder portion are preferably connected by the side walls.

According to the configuration, since the mounting feet and the support cylinder portion are connected by the side walls, the amount of the material and the weight are reduced while the rigidity of the mounting feet as well as the support cylinder portion is improved.

The side walls of the bulge portion and the inner cylinder are preferably connected by a plurality of inner ribs.

According to the configuration, the side walls of the bulge portion and the inner cylinder are connected by the internal ribs in the internal space expanded by the bulge portion, and thus, the rigidity of the inner cylinder and the side walls is improved. Moreover, if the ribs are provided outside the housing in order to reinforce the support cylinder portion, water can collect in a space surrounded by the ribs, for example, but it is avoided in the case of the inner ribs.

The inner ribs preferably include apex connecting ribs extending from the inner cylinder toward positions corresponding to the mounting feet.

According to the configuration, since the inner ribs include the apex connecting ribs, each extending from the inner cylinder toward the position corresponding to the mounting foot, the rigidity of the mounting foot is further improved.

The inner ribs preferably include side connecting ribs each extending from the inner cylinder toward a center position between an adjacent pair of the mounting feet.

According to the configuration, since the inner ribs include the side connecting ribs, each extending from the inner cylinder toward a center position between an adjacent pair of the mounting feet, the rigidity of the connecting walls in the bulge portion is improved with a good balance.

A pair of bearings, which support the output shaft, are preferably arranged separately from each other on both ends of an inner peripheral surface of the support cylinder portion.

According to the configuration, the bearings, which support the output shaft, are provided separately from each other on both ends of the inner peripheral surface of the support cylinder portion. Since there is no bearing provided on an intermediate portion of the support cylinder portion, a space in which lubricant oil collects is provided in the intermediate portion, that is, between the bearings, and splash of the lubricant oil, which expands at a high temperature, is reduced, for example.

In accordance with a second aspect, a motor is provided that includes a motor main body, which drives a rotary shaft, a reduction gear connected to the rotary shaft, and the above described gear housing for a motor.

According to the configuration, the same advantage as that of the above-described housing for a motor is obtained.

In accordance with a third aspect of the present invention, a motor is provided that includes a motor main body, which drives a rotary shaft, a reduction gear connected to the rotary shaft, and a gear housing, which is fixed to the motor main body, contains the reduction gear, and has a first side surface. The gear housing includes a plurality of mounting feet formed at intervals to protrude from the first side surface and to be fixed to a mounting member, and a bulge portion formed on the first side surface and bulging outward to expand an internal space of the gear housing. The bulge portion has a plurality of side walls installed to protrude from the first side surface and an upper wall, which connects distal ends in a protruding direction of the connecting walls. The mounting feet are connected by the side walls and the upper wall.

According to the configuration, the same advantage as that of the above-described housing for a motor is obtained.

EFFECTS OF THE INVENTION

According to the present invention, a gear housing for a motor and a motor are provided that reduce the amount of the material and the weight while improving the rigidity of the mounting feet.

DETAILED DESCRIPTION OF THE PREFERRED EMBODIMENTS

A motor and a motor housing according to one embodiment of the present invention will be described below by referring to FIGS. 1 to 4.

Figure 1:
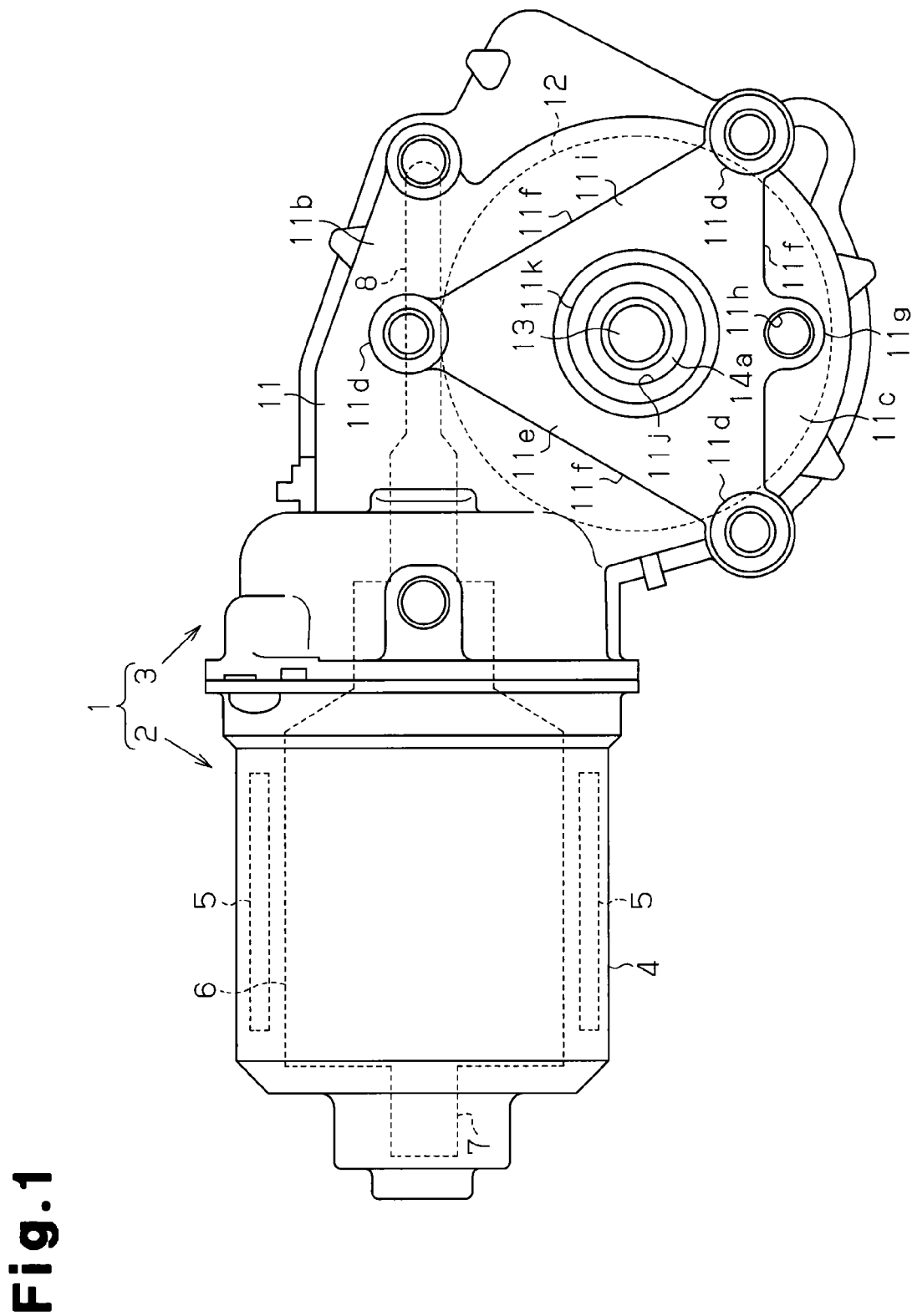
FIG. 1 is a side view illustrating a motor according to one embodiment of the present invention.

As illustrated in FIG. 1, a motor 1 is a wiper motor used as a drive source for a vehicle wiper device, which wipes adhering substances such as raindrops adhering on a windshield of a vehicle. The motor 1 is composed of a motor main body 2 and a speed reducing portion 3.

The motor main body 2 includes a cup-shaped yoke 4, a magnet 5 secured to the inner peripheral surface of the yoke 4, and an armature 6 contained in the yoke 4. The motor main body 2 drives to rotate the armature 6. The armature 6 has a rotary shaft 7. A distal end portion of the rotary shaft 7 protrudes from the yoke 4, and a worm 8 is formed at the distal end portion thereof.

The speed reducing portion 3 includes a gear housing 11, a housing cover (not shown) a worm wheel 12 as a gear wheel, and an output shaft 13. The housing cover blocks an opening 11a of the gear housing 11 (see FIG. 3). The worm wheel 12 is contained in the gear housing 11 and meshed with the worm 8. The output shaft 13 is integrally rotated with the worm wheel 12. In this embodiment, the worm 8 and the worm wheel 12 constitute the reduction gear.

In detail, the gear housing 11 is formed by die-cast molding of an aluminum alloy. The gear housing 11 has a worm containing portion 11b and a wheel containing portion 11c as illustrated in FIGS. 1 to 3. The worm containing portion 11b extends along the rotary shaft 7 of the motor main body 2 and contains the worm 8. The wheel containing portion 11c communicates with the worm containing portion 11b and contains the worm wheel 12 meshed with the worm 8.

Figure 2A:
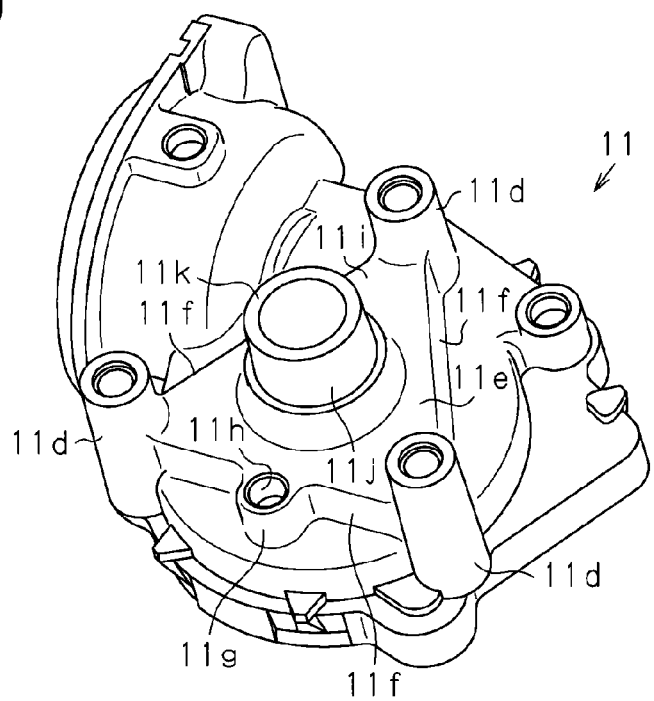
FIG. 2(a) is a side view illustrating an outer side surface of the gear housing.
Figure 2B:
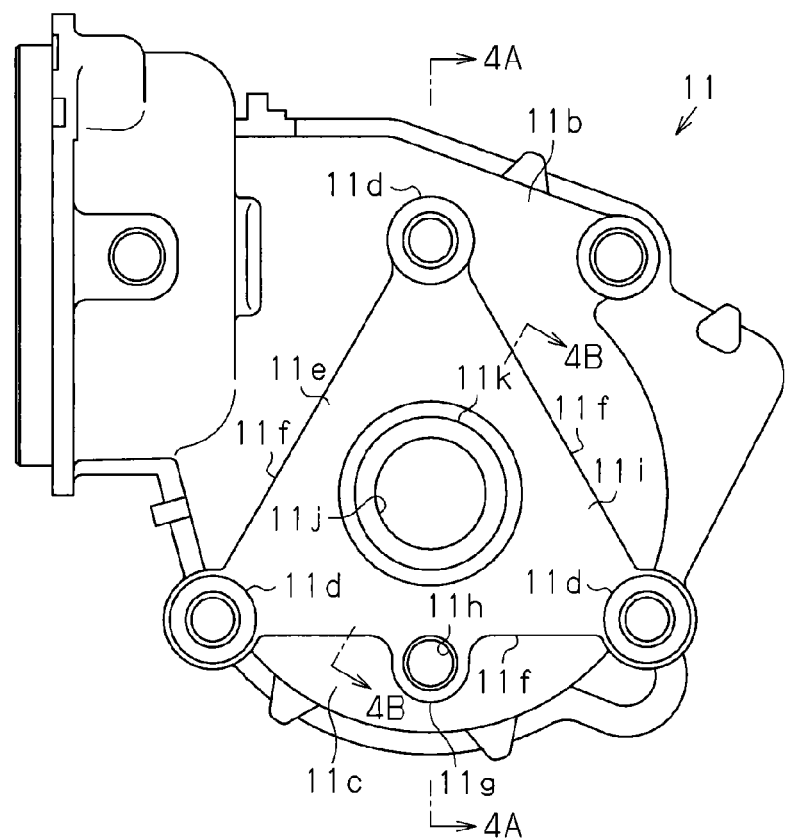
FIG. 2(b) is a side view illustrating an outer side surface of the gear housing.
Figure 3A:
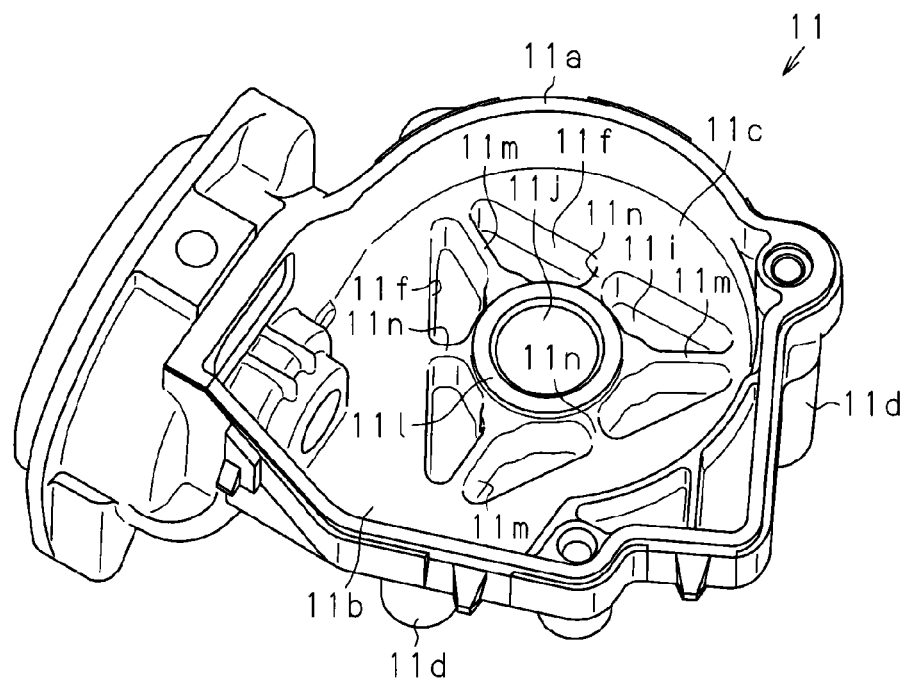
FIG. 3(a) is a perspective view illustrating the inside of the gear housing.
Figure 3B:
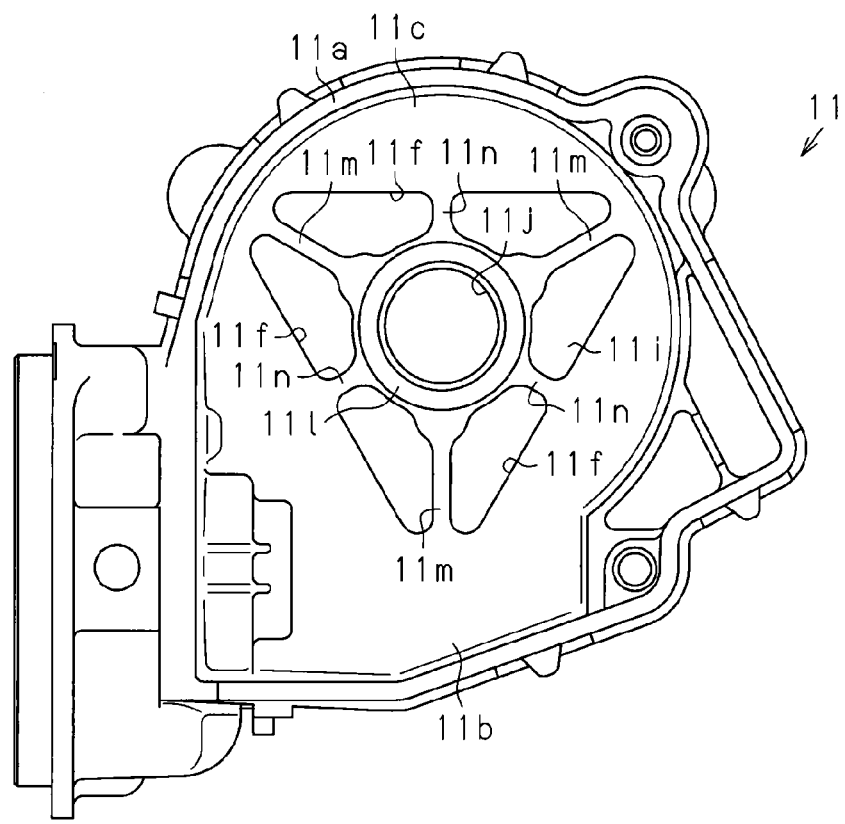
FIG. 3(b) is a side view illustrating the inside of the gear housing.

In the gear housing 11, the outer side surface illustrated in FIG. 2(b), that is, the surface on the side where the output shaft 13 protrudes outward is defined as a first side surface, while the inner side surface illustrated in FIG. 3(b), that is, the surface on which the wheel containing portion 11c is formed is defined as a second side surface. The outer side surface and the inner side surface of the gear housing 11 are located on the sides opposite to each other. The first side surface and the second side surface of the gear housing 11 are located on the sides opposite to each other. Moreover, three mounting feet 11d to be fixed to a non-illustrated mounting member (vehicle body) of a vehicle are formed to protrude on the outer side surface of the gear housing 11 at intervals. Each of the mounting feet 11d is substantially cylindrical. The mounting feet 11d of this embodiment are arranged around a position corresponding to the output shaft 13. Moreover, the mounting feet 11d are arranged to form a substantially regular triangle such that a position corresponding to the position where the worm 8 is meshed with the worm wheel 12 is one apex.

Moreover, a bulge portion 11e bulging outward to expand the inner space is formed on the outer side surface of the gear housing 11 as illustrated in FIGS. 2(a) and 2(b). The bulge portion 11e includes side walls 11f installed to protrude from the outer side surface of the gear housing 11 and extending in the bulging direction. The side walls 11f constitute connecting walls, which rectilinearly connect each adjacent pair of the mounting feet 11d so that a triangle having the three mounting feet 11d as apexes is formed when seen from the distal ends of the mounting feet 11d (see FIG. 2(b)). The side walls 11f continuously connect the three mounting feet 11d. In this embodiment, a positioning bulge portion 11g, which bulges outward from the triangle, is formed on one of the side walls 11f as illustrated in FIG. 2. A recess portion 11h for positioning is formed in the positioning bulge portion 11g. Moreover, a cylindrical support cylinder portion 11j, which will be described below, is formed at the center position of an inscribed circle of the substantially regular triangle having the three mounting feet 11d as apexes thereof with the centers coinciding.

The bulge portion 11e includes an upper wall 11i extending in a direction crossing the axis of the output shaft 13. The upper wall 11i connects the distal ends in the protruding direction of the side walls 11f (connecting walls). A cylindrical support cylinder portion 11j, which allows the inside and the outside of the gear housing 11 to communicate with each other and supports the output shaft 13, is formed at the center of the wheel containing portion 11c in the upper wall 11i.

Figure 4A:
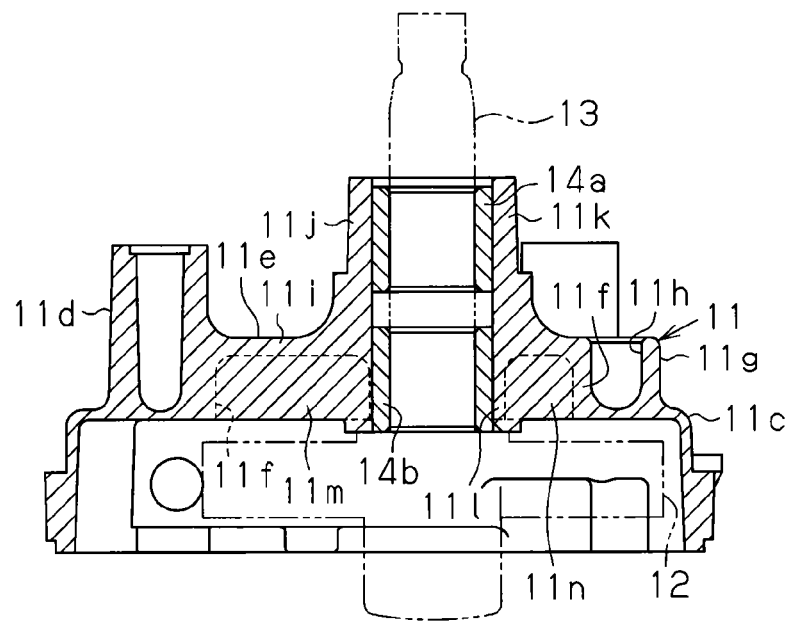
FIG. 4(a) is a cross-sectional view taken along line 4A-4A in FIG. 2(b)
Figure 4B:
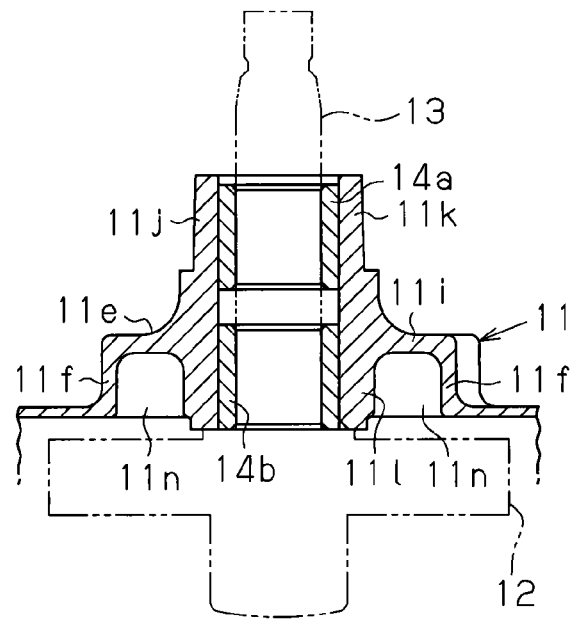
FIG. 4(b) is a cross-sectional view taken along line 4B-4B in FIG. 2(b)

The support cylinder portion 11j in this embodiment is composed of an outer cylinder 11k protruding outward from the upper wall 11i and an inner cylinder 11l protruding inward from the upper wall 11i and communicating with the outer cylinder 11k as illustrated in FIGS. 2(a), 3(a), and 4(b).

Moreover, bearings 14a and 14b, which support the output shaft 13, are provided separately from each other in the axial direction on both ends of the support cylinder portion 11j as illustrated in FIGS. 4(a) and 4(b). The bearings 14a and 14b are pressed into and fixed to the inner peripheral surface of the support cylinder portion 11j and support the output shaft 13 of the worm wheel 12 constituting the reduction gear in a cantilever manner. The bearings 14a and 14b are oil-impregnated bearings made of sintered metal.

The side walls 11f and the inner cylinder 11l of the bulge portion 11e are connected by a plurality of inner ribs 11m and 11n as illustrated in FIGS. 3(a) and 3(b) as well as in FIGS. 4(a) and 4(b). The inner ribs 11m as apex connecting ribs extend from the inner cylinder 11l to a position corresponding to each of the mounting feet 11d (see FIG. 2), that is, to each apex of the triangles. The inner ribs 11n as side connecting ribs extend from the inner cylinder 11l to the center position between the mounting feet 11d, that is, to the center of each side of the triangles. The inner ribs 11m and 11n are formed to extend inward from the upper wall 11i in order to connect the side walls 11f and the inner cylinder 11l.

Characteristic advantages of the above-described embodiment will now be described below.

(1) The bulge portion 11e is formed bulging outward on the outer side surface of the gear housing 11 to expand the internal space. The mounting feet lid are connected by the side walls 11f of the bulge portion 11e installed to protrude from the outer side surface and upper wall 11i of the bulge portion 11e, which connects the distal ends in the protruding direction of the side walls 11f. Thus, the amount of the material and the weight of the gear housing 11 are reduced while the rigidity of the mounting feet 11d is improved mutually. That is, rigidity is improved since the distal edges in the protruding direction of the side walls 11f are connected by the upper wall 11i of the bulge portion 11e. Therefore, the shape of the gear housing 11 is made simpler than the prior-art configuration in which reinforcing ribs are provided. Moreover, the thickness of the bulge portion 11e is decreased, and the amount of the material and the weight of the gear housing 11 are reduced.

(2) The side walls 11f connect the mounting feet 11d so that a triangle having the three mounting feet 11d as apexes is formed when seen from the distal ends of the mounting feet 11d. The three side walls 11f form the three sides of the triangle, and thus, the three mounting feet 11d are connected rectilinearly by the shortest distances. Therefore, the amount of the material and the weight of the gear housing 11 are reduced while the rigidity of the mounting feet 11d is improved as compared with the annular connection of the mounting feet 11d by the side walls 11f, for example.

(3) The cylindrical support cylinder portion 11j supports the output shaft 13 rotating integrally with the worm wheel 12 constituting the reduction gear. The support cylinder portion 11j is provided by being connected to the bulge portion 11e and thus, the rigidity of the support cylinder portion 11j is also improved by the bulge portion 11e.

In detail, in this embodiment, the support cylinder portion 11j has the outer cylinder 11k extending outward from the upper wall 11i and the inner cylinder 11l extending inward from the upper wall 11i and communicating with the outer cylinder 11k. That is, the upper wall 11i of the bulge portion 11e is connected at the intermediate position in the extending direction of the support cylinder portion 11j. Thus, the rigidity of the outer cylinder 11k and the inner cylinder 11l is improved in this embodiment as compared with a support cylinder portion that supports the output shaft and has the same length as that of the output shaft 13, by largely protruding only outward from the upper wall 11i, and the output shaft 13 is firmly supported. That is, the support cylinder portion 11j needs to ensure such rigidity that can receive a force in a direction orthogonal to the shaft applied to the output shaft 13 (reaction force from the load), and a large force is applied particularly to the base end and the distal end of the support cylinder portion 11*j*. Therefore, in order to ensure rigidity in the support cylinder portion, which supports the shaft by largely protruding only outward from the upper wall 11*i*, the support cylinder portion needs to be designed with high rigidity by increasing the number of ribs reinforcing the support cylinder portion or by increasing the thickness thereof, for example. In contrast, the projection amounts from the upper wall 11*i* of the outer cylinder 11*k* and the inner cylinder 11*l* are small in the configuration in which the support cylinder portion 11*j* has the outer cylinder 11*k* and the inner cylinder 11*l*, and thus, the rigidity is ensured even if the support cylinder portion 11*j* is designed with relatively low rigidity without increasing the number of the ribs or the thickness thereof. Therefore, even if the inner ribs 11*m* and 11*n*, which reinforce the support cylinder portion 11*j* (inner cylinder 11*l*), are provided as in this embodiment, the output shaft 13 is firmly supported by reducing the number of the ribs or the thickness thereof. As a result, the amount of the material and the weight of the gear housing 11 are reduced, and thus the manufacturing cost of the gear housing 11 is decreased.

(4) The side walls 11*f* and the inner cylinder 11*l* of the bulge portion 11*e* are connected by the inner ribs 11*m* and 11*n* in the internal space expanded by the bulge portion 11*e*. Thus, the rigidity of the inner cylinder 11*l* and the side walls 11*f* is mutually improved. Moreover, if ribs are provided outside the housing in order to reinforce the support cylinder portion 11*j*, water can collect in a spot surrounded by the ribs, for example. However, such collection of water is avoided with the inner ribs 11*m* and 11*n*.

(5) The inner ribs 11*m* as the apex connecting ribs extend from the inner cylinder 11*l* toward the positions corresponding to the mounting feet 11*d* and thus, the rigidity of the mounting feet 11*d* is further improved.

(6) The inner ribs 11*n* as the side connecting ribs extend from the inner cylinder 11*l* toward the center positions each located between an adjacent pair of the mounting feet 11*d* and thus, the rigidity of the side walls 11*f* in the bulge portion 11*e* is improved with a good balance.

(7) The housing wall, which is a base portion for the outer cylinder 11*k* and the inner cylinder 11*l*, is the upper wall 11*i* of the bulge portion 11*e* formed to bulge outward from the outer side surface of the gear housing 11 to expand the internal space. Therefore, the internal space of the gear housing 11 is expanded, and the inner cylinder 11*l* and the inner ribs 11*m* and 11*n* is provided in the containing space while the containing space for the reduction gear (the worm 8 and the worm wheel 12) is ensured.

(8) The bearings 14*a* and 14*b*, which support the output shaft 13, are provided separately from each other on both sides of the inner peripheral surface of the support cylinder portion 11*j* and thus, a material cost is reduced without providing bearings needlessly, for example. That is, the bearings 14*a* and 14*b* are provided only on both sides of the support cylinder portion 11*j* to which a large force is applied, that is, except the intermediate portion. Therefore, the material cost is reduced without providing the bearings needlessly as compared with provision of the bearings in the whole axial direction including the intermediate portion of the support cylinder portion 11*j*. Moreover, since no bearing is provided on the intermediate portion of the support cylinder portion 11*j*, a space where the lubricant oil collects is provided in the intermediate portion, that is, between the bearings 14*a* and 14*b*, and splash of the lubricant oil expanding at a high temperature is reduced, for example.

The above-described embodiment may be modified as follows:

In the above-described embodiment, the side walls 11*f* connect the mounting feet 11*d* to each other so that a triangle having the three mounting feet 11*d* as apexes is formed when seen from the distal ends of the mounting feet 11*d*. In contrast, the side walls 11*f* may be changed to any other shapes as long as the mounting feet 11*d* can be connected to each other. For example, the side walls 11*f* may be arranged so that the mounting feet 11*d* are connected annularly. That is, the side walls 11*f* may be formed in a columnar state outward, that is, to expand concentrically with the support cylinder portion 11*j*.

Figure 5:
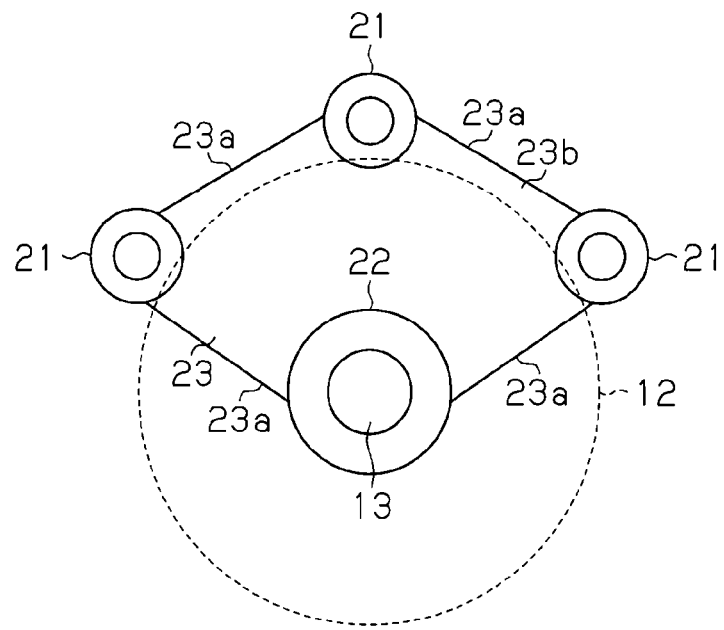
FIG. 5 is a side view schematically illustrating a gear housing according a modification.

Moreover, the above-described embodiment may be changed as schematically illustrated in FIG. 5, for example. That is, mounting feet 21 in this example are formed so that the triangle having them as apexes is shifted from a support cylinder portion 22, which supports the output shaft 13, that is, they are not overlapped when seen from the distal ends of the mounting feet 21. A bulge portion 23 is formed so that side walls 23*a* connect the mounting feet 21 and the support cylinder portion 22, and an upper wall 23*b* makes a substantially diamond shape when seen from the distal ends of the mounting feet 21. Then, the amount of the material and the weight of the gear housing 11 are reduced while the rigidity of the mounting feet 21 as well as the support cylinder portion 22 is improved.

Figure 6:
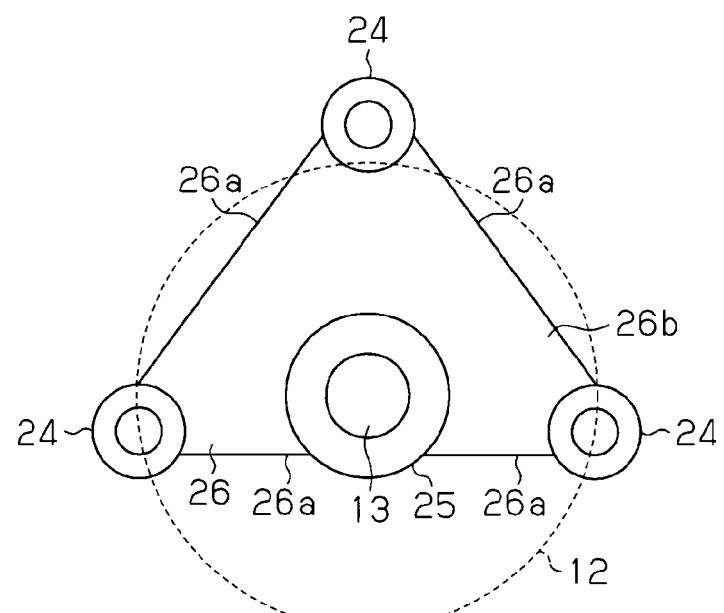
FIG. 6 is a side view schematically illustrating a gear housing according to another modification.

Moreover, the above-described embodiment may be changed as illustrated in FIG. 6, for example. That is, mounting feet 24 in this example are arranged so that one side of the triangle having them as apexes is overlapped with the support cylinder portion 25. Side walls 26*a* of a bulge portion 26 are arranged to form the triangle having the three mounting feet 24 as apexes and so that the mounting feet 24 and the support cylinder portion 25 are connected to each other. As a result, the shape of an upper wall 26*b* is substantially triangular. Moreover, the support cylinder portion 25 is formed to have an inner cylinder (not shown) in the internal space expanded by the bulge portion 26 in this example. In this case, too, the amount of material and the weight of the gear housing 11 are reduced while the rigidity of the mounting feet 24 and the support cylinder portion 25 is improved.

The three mounting feet 11*d* are formed in the above-described embodiment, but the number of the mounting feet 11*d* may be other numbers (2 or 4, for example) as long as it is two or more.

In the above-described embodiment, the support cylinder portion 11*j*, which supports the output shaft 13, is composed of the outer cylinder 11*k* protruding outward from the upper wall 11*i* and the inner cylinder 11*l* protruding inward from the upper wall 11*i*. The configuration is not limited to that, and the support cylinder portion 11*j* may merely protrude outward from the gear housing 11 (the upper wall 11*i*). That is, the inner cylinder 11*l* may be omitted.

In the above-described embodiment, the side walls 11*f* and the inner cylinder 11*l* of the bulge portion 11*e* are connected by the inner ribs 11*m* and 11*n*. The configuration is not limited to that, and the side walls 11*f* and the inner cylinder 11*l* do not have to be connected by the inner ribs 11*m* and 11*n*. Alternatively, an outer rib that reinforces the outer cylinder 11*k* may be provided outside of the bulge portion 11*e* (the upper wall 11*i*).

In the above-described embodiment, the inner ribs 11*m* and 11*n* include the inner ribs (apex connecting ribs) 11*m*, each extending from the inner cylinder 11*l* toward the position corresponding to each of the mounting feet 11*d*, that is, toward each apex of the triangle, and the inner ribs (side connecting ribs) 11*n*, each extending from the inner cylinder 11*l* toward the center position between each adjacent pair of the mounting feet 11*d*, that is, toward the center of each side of the triangle. The configuration of the inner ribs 11*m* and 11*n* may be arbitrarily changed. For example, the inner ribs (apex connecting ribs) 11*m* extending toward the position corresponding to each mounting foot 11*d*, that is, toward each apex of the triangle may be omitted. The inner ribs (side connecting ribs) 11*n* extending toward the center position between the mounting feet 11*d*, that is, toward the center of each side of the triangle may be omitted. Alternatively, inner ribs may be provided at a position different from the inner ribs 11*m* and 11*n*.

In the above-described embodiment, the bearings 14*a* and 14*b*, which support the output shaft 13, are provided separately from each other on the ends of the support cylinder portion 11*j*. The configuration is not so limited, and the bearings may be disposed along the entire axial direction of the support cylinder portion 11*j*.

In the above-described embodiment, the housing wall, which is a base portion for the outer cylinder 11*k* and the inner cylinder 11*l*, is the upper wall 11*i* of the bulge portion 11*e* bulging from the outer side surface of the gear housing 11 outward to expand the internal space. The configuration is not so limited, and a wall of the gear housing that does not bulge out may be formed as the housing wall. That is, the wall including the outer side surface in the gear housing on which the bulge portion 11*e* and the inner ribs 11*m* and 11*n* are not formed in the above-described embodiment may be formed as the housing wall. The outer cylinder 11*k* and the inner cylinder 11*l* may be formed protruding from the housing wall. In this case, too, the same advantages as in the advantage (3) of the above-described embodiment are obtained.

In the above-described embodiment, the motor 1 is used as a drive source of a vehicle wiper device. The present invention is not so limited and may be embodied in a motor for other devices such as a motor used as a drive source of a power window device, for example.

The invention claimed is:

1. A gear housing for a motor, wherein the gear housing is directly fixed to a motor main body, which drives a rotary shaft, contains a reduction gear connected to the rotary shaft, and has a first side surface, the gear housing comprising:
   a plurality of mounting feet formed at intervals to protrude from the first side surface and to be fixed to a mounting member;
   a bulge portion formed on the first side surface and bulging outward and forming an expanded internal space in the gear housing; and
   a cylindrical support cylinder portion, which supports an output shaft rotated integrally with the reduction gear, wherein
   the bulge portion has a plurality of side walls installed to protrude from the first side surface and an upper wall, which connects distal ends in the protruding direction of the side walls,
   the mounting feet are connected together by the side walls and the upper wall, and
   the support cylinder portion is connected to the bulge portion.

2. The gear housing for a motor according to claim 1, wherein
   the mounting feet include three mounting feet, and
   the side walls continuously connect the three mounting feet so that a space is formed among the three mounting feet.

3. The gear housing for a motor according to claim 2, wherein the side walls connect the three mounting feet so that a triangle having the three mounting feet as apexes is formed when seen from the distal ends of the mounting feet.

4. The gear housing for a motor according to claim 1, wherein the support cylinder portion has an outer cylinder, which protrudes outward from the upper wall, and an inner cylinder, which protrudes inward from the upper wall and communicates with the outer cylinder.

5. The gear housing for a motor according to claim 4, wherein the side walls of the bulge portion and the inner cylinder are connected by a plurality of inner ribs.

6. The gear housing for a motor according to claim 5, wherein the inner ribs include apex connecting ribs extending from the inner cylinder toward positions corresponding to the mounting feet.

7. The gear housing for a motor according to claim 5, wherein the inner ribs include side connecting ribs each extending from the inner cylinder toward a center position between an adjacent pair of the mounting feet.

8. The gear housing for a motor according to claim 1, wherein the mounting feet and the support cylinder portion are connected by the side walls.

9. The gear housing for a motor according to claim 1, wherein a pair of bearings, which support the output shaft, are arranged separately from each other on both ends of an inner peripheral surface of the support cylinder portion.

10. A motor comprising:
   a motor main body, which drives a rotary shaft;
   a reduction gear connected to the rotary shaft; and
   a gear housing, which is directly fixed to the motor main body, contains the reduction gear, and has a first side surface, wherein
   the gear housing includes:
      a plurality of mounting feet formed at intervals to protrude from the first side surface and to be fixed to a mounting member;
      a bulge portion formed on the first side surface and bulging outward and forming an expanded internal space in the gear housing; and
      a cylindrical support cylinder portion, which supports an output shaft rotated integrally with the reduction gear, wherein
   the bulge portion has a plurality of side walls installed to protrude from the first side surface and an upper wall, which connects distal ends in a protruding direction of the side walls, and
   the mounting feet are connected by the side walls and the upper wall, and
   the support cylinder portion is connected to the bulge portion.

11. A gear housing for a motor, wherein the gear housing is fixed to a motor main body, which drives a rotary shaft, contains a reduction gear connected to the rotary shaft, and has a first side surface, the gear housing comprising:
   a bulge portion formed on the first side surface and bulging outward and forming an expanded internal space in the gear housing; and
   a cylindrical support cylinder portion connected to the bulge portion, the support cylinder portion supporting an output shaft rotated integrally with the reduction gear, wherein
   the bulge portion has a plurality of side walls installed to protrude from the first side surface and an upper wall, which connects distal ends in the protruding direction of the side walls,
   the support cylinder portion has an inner cylinder, which protrudes inward from the upper wall and the side walls of the bulge portion; further comprising a plurality of mounting feet formed at intervals to protrude from the first side surface and to be fixed to a mounting member, wherein the mounting feet include three mounting feet, and the side walls continuously connect the three mounting feet so that a space is formed among the three mounting feet and the inner cylinder are connected by a plurality of inner ribs.

12. The gear housing for a motor according to claim 11, wherein the side walls connect the three mounting feet so that a triangle having the three mounting feet as apexes is formed when seen from distal ends of the mounting feet.

13. The gear housing for a motor according to claim 11, wherein the support cylinder portion has an outer cylinder, which protrudes outward from the upper wall and communicates with the inner cylinder.

14. The gear housing for a motor according to claim 11, wherein the mounting feet and the support cylinder portion are connected by the side walls.

15. The gear housing for a motor according to claim 11, wherein the inner ribs include apex connecting ribs extending from the inner cylinder toward positions corresponding to the mounting feet.

16. The gear housing for a motor according to claim 11, wherein the inner ribs include side connecting ribs each extending from the inner cylinder toward a center position between an adjacent pair of the mounting feet.

17. The gear housing for a motor according to claim 11, wherein a pair of bearings, which support the output shaft, are arranged separately from each other on both ends of an inner peripheral surface of the support cylinder portion.

* * * * *